US006254978B1

(12) United States Patent
Bahar et al.

(10) Patent No.: US 6,254,978 B1
(45) Date of Patent: *Jul. 3, 2001

(54) ULTRA-THIN INTEGRAL COMPOSITE MEMBRANE

(75) Inventors: Bamdad Bahar, Baltimore; Alex R. Hobson, Elkton, both of MD (US); Jeffrey A. Kolde, Coopersburg, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/209,932

(22) Filed: Jul. 8, 1998

Related U.S. Application Data

(63) Continuation of application No. 08/903,844, filed on Jul. 31, 1997, now abandoned, which is a continuation of application No. 08/339,425, filed on Nov. 14, 1994, now abandoned.

(51) Int. Cl.[7] ............................. B32B 5/14; C25B 13/08
(52) U.S. Cl. ................. 428/305.5; 210/500.36; 428/308.4; 428/422
(58) Field of Search .................. 210/500.36, 505, 210/507, 508; 428/305.5, 308.4, 311.51, 422

(56) References Cited

U.S. PATENT DOCUMENTS

| 3,692,569 | 9/1972 | Grot . |
| 4,218,542 | 8/1980 | Ukihashi et al. . |
| 4,255,523 | 3/1981 | Ukihashi et al. . |
| 4,311,567 | 1/1982 | White . |
| 4,341,615 | 7/1982 | Bachot et al. ................ 204/296 |
| 4,433,082 | 2/1984 | Grot . |
| 4,453,991 | 6/1984 | Grot ........................... 156/94 |
| 4,528,083 | 7/1985 | LaConti et al. . |
| 4,604,170 | 8/1986 | Miyake et al. ................ 204/98 |
| 4,698,243 | 10/1987 | Carl et al. . |
| 4,865,925 | 9/1989 | Ludwig et al. ............... 429/12 |
| 4,902,308 | 2/1990 | Mallouck et al. ............. 55/16 |
| 4,954,388 | 9/1990 | Mallouck et al. ............. 428/198 |
| 5,041,195 | 8/1991 | Taylor et al. . |
| 5,082,475 | 1/1992 | Mallouk et al. ............... 55/16 |
| 5,094,895 | 3/1992 | Branca et al. ................. 428/36.91 |
| 5,133,842 | 7/1992 | Taylor et al. . |
| 5,183,545 | 2/1993 | Branca et al . ................ 204/252 |
| 5,183,713 | 2/1993 | Kunz . |
| 5,190,813 | 3/1993 | Ohashi et al. ................ 428/319 |
| 5,350,643 | 9/1994 | Imahashi et al. . |
| 5,547,551 | * 8/1996 | Bahar et al. ................ 204/296 |
| 5,599,614 | * 2/1997 | Bahar et al. ................ 442/171 |
| 5,635,041 | * 6/1997 | Bahar et al. ................ 204/282 |

FOREIGN PATENT DOCUMENTS

| 51-71888 | 6/1976 | (JP) . |
| 62-240627 | 9/1987 | (JP) . |
| 575835 | 10/1993 | (JP) . |
| H6-29032 | 2/1994 | (JP) . |
| 9114021 | 9/1993 | (WO) . |

OTHER PUBLICATIONS

Article, Liu et al. "Ion Transporting Composite Membranes",J.Electrochem.Soc., vol. 137, No. 2, Feb. 1990.
Reginald M. Penner, Charles, R. Martin, Ion Transporting Membranes, Journal Electrochem Soc., vol. 132 #2, Feb. 1985.

* cited by examiner

Primary Examiner—Blaine Copenheaver
(74) Attorney, Agent, or Firm—Morgan & Finnegan, LLP

(57) ABSTRACT

An integral composite membrane is provided including a porous polymeric membrane impregnated with a perfluoro ion exchange material to make the micropores of the membrane occlusive and a surfactant having a molecular weight greater than 100 wherein the thickness of the composite membrane is less than 0.025 mm. Methods for making and regenerating the integral composite membrane are also provided.

60 Claims, 2 Drawing Sheets

ULTRA-THIN INTEGRAL COMPOSITE MEMBRANE

This is a continuation of application Ser. No. 08/903,844 filed Jul. 31, 1997, now abandoned which is a continuation of application Ser. No. 08/339,425, filed Nov. 14, 1994, now abandoned.

FIELD OF THE INVENTION

An integral composite membrane having a thickness of less than about 1 mil (0.025 mm) is provided which is useful in electrolytic processes and other chemical separations.

BACKGROUND OF THE INVENTION

Ion exchange membranes (IEM) are used in fuel cells as solid electrolytes. A membrane is located between the cathode and anode and transports protons formed near the catalyst at the hydrogen electrode to the oxygen electrode thereby allowing a current to be drawn from the cell. These membranes are particularly advantageous as they replace heated acidic liquid electrolytes such as phosphoric acid fuel cells which are very hazardous.

Ion exchange membranes are used in chloralkali applications to separate brine mixtures and form chlorine gas and sodium hydroxide. The membrane selectively transports the sodium ions across the membrane while rejecting the chloride ions. IEM's are also useful in the area of diffusion dialysis where for example, caustic solutions are stripped of their impurities. The membranes are also useful for pervaporation and vapor permeation separations due to their ability to transfer polar species at a faster rate than their ability to transfer non-polar species.

These membranes must have sufficient strength to be useful in their various applications. Often this need for increased strength requires the membranes to be made thicker which decreases their ionic conductance. For example, ion exchange membranes that are not reinforced such as those commercially available from E. I. DuPont de Nemours, Inc. and sold under the trademark Nation are inherently weak at small thicknesses (e.g., less than 0.050 mm) and must be reinforced with additional materials causing the final product to have increased thickness. Moreover, these materials cannot be reliably manufactured pinhole free.

U.S. Pat. No. 3,692,569 to Grot relates to the use of a coating of a copolymer of fluorinated ethylene and a sulfonyl-containing fluorinated vinyl monomer on a fluorocarbon polymer that was previously non-wettable. The fluorocarbon polymer may include tetrafluoroethylene polymers (not porous expanded PTFE). This coating provides a topical treatment to the surface so as to decrease the surface tension of the fluorocarbon polymer. U.S. Pat. No. 4,453,991 to Grot relates to a process for making a liquid composition of a perfluorinated polymer having sulfonic acid or sulfonate groups in a liquid medium that is contacted with a mixture of water and a second liquid such as a lower alcohol. The liquid made by the process may be used as a coating, a cast film, and as a repair for perfluorinated ion exchange films and membranes. Cast or coated products made with the liquid composition had thicknesses on the order of 5 mils (0.125 mm).

U.S. Pat. No. 4,902,308 to Mallouk, et al. relates to a film of porous expanded PTFE having surfaces, both exterior and internal surfaces adjacent to pores, coated with a metal salt of perfluoro-cation exchange polymer. The base film of porous, expanded PTFE had a thickness of between 1 mil and 6 mils (0.025–0.150 mm). The final composite product had a thickness of at least 1 mil (0.025 mm) and preferably had a thickness of between 1.7 and 3 mils (0.043–0.075 mm). The composite product was permeable to air and the air flow as measured by the Gurley densometer ASTM D726-58 was found to be between 12 and 22 seconds.

U.S. Pat. No. 4,954,388 to Mallouk, et al. relates to an abrasion-resistant, tear resistant, multi-layer composite membrane having a film of continuous perfluoro ion exchange polymer attached to a reinforcing fabric by means of an interlayer of porous expanded PTFE. A coating of a perfluoro ion exchange resin was present on at least a portion of the internal and external surfaces of the fabric and porous ePTFE. The composite membrane made in accordance with the teachings of this patent resulted in thicknesses of greater than 1 mil (0.025 mm) even when the interlayer of porous ePTFE had a thickness of less than 1 mil (0.025 mm).

U.S. Pat. No. 5,082,472 to Mallouk, et al. relates to a composite membrane of microporous film in laminar contact with a continuous perfluoro ion exchange resin layer wherein both layers have similar area dimensions. Surfaces of internal pores of ePTFE may be coated at least in part with perfluoro ion exchange resin coating or the pores in the microstructure may be filled or partially filled with resin. The membrane of ePTFE had a thickness of about 2 mils (0.050 mm) or less and the perfluoro ion exchange layer in its original state had a thickness of about 1 mil (0.025 mm). The ePTFE layer of this composite membrane imparted mechanical strength to the composite structure and the pores of the ePTFE were preferably essentially unfilled so as to not block the flow of fluids.

U.S. Pat. Nos. 5,094,895 and 5,183,545 to Branca, et al. relate to a composite porous liquid-permeable article having multiple layers of porous ePTFE bonded together and having interior and exterior surfaces coated with a perfluoro ion exchange polymer. This composite porous article is particularly useful as a diaphragm in electrolytic cells. The composite articles are described to be relatively thick, preferably between from 0.76 and 5 mm.

U.S. Pat. No. 4,341,615 to Bachot, et al. relates to a fluorinated resin base material treated with a copolymer of an unsaturated carboxylic acid and a non-ionic unsaturated monomer for use as a porous diaphragm in the electrolysis of alkaline metal chlorides. The fluorinated resin base material may be reinforced with fibers such as asbestos, glass, quartz, zirconia, carbon, polypropylene, polyethylene, and fluorinated polyhalovinylidene (col. 2, lines 13–17). Only 0.1 to 6 percent of the total pore volume of the support sheet is occupied by the carboxylic copolymer.

U.S. Pat. No. 4,604,170 to Mivake et al. relates to a multi-layered diaphragm for electrolysis comprising a porous layer of a fluorine-containing polymer having a thickness of from 0.03 to 0.4 mm with its interior and anode-side surface being hydrophilic and an ion exchange layer on its cathode surface with the ion exchange layer being thinner than the porous layer but of at least 0.005 mm and the total thickness of the diaphragm being from 0.035 to 0.50 mm.

U.S. Pat. No. 4,865,925 to Ludwig, et al. relates to a gas permeable electrode for electrochemical systems. The electrode includes a membrane located between and in contact with an anode and a cathode. The membrane, which may be made of expanded polytetrafluoroethylene, may be treated with an ion exchange material with the resulting membrane maintaining its permeability to gas. Membrane thicknesses are described to be between 1 and 10 mils, (0.025–0.25 mm), with thicknesses of less than 5 mils (0.125) to be desirable. Examples show that membrane thicknesses range from 15 to 21 mils.

Japanese Patent Application No. 62-240627 relates to a coated or an impregnated membrane formed with a perfluoro type ion exchange resin and porous PTFE film to form an integral unit. No water or surfactant were used in the manufacture of this membrane. The combination is accomplished by fusion or by coating and does not provide for permanent adhesion of the ion exchange resin to the inside surface of the PTFE film. The weight ratio of the perfluoro ion exchange resin to PTFE is described to be in the range of 3 to 90% with a preferable weight ratio of 10 to 30%.

Japanese Application No. 62-280230 and 62-280231 relate to a composite structure in which a scrim or open fabric is heat laminated and encapsulated between a continuous perfluoro ion exchange membrane and an ePTFE sheet thus imparting tear strength to the structure. The composite membrane was not used for ionic conduction.

Additional research has also been conducted on the use of perfluorosulfonic acid polymers with membranes of expanded porous polytetrafluoroethylene such as that described in Journal Electrochem. Soc., Vol. 132, No. 2, February 1985, p. 514–515. The perfluoro ion exchange material was in an ethanol based solvent without the presence of water or surfactant. Moreover, ultrasonic energy in the treatment of this membrane.

Heretofore and as represented by the references discussed above, there is a need for an integral ultra-thin strong ion exchange composite membrane, with long term chemical and mechanical stability that has a thickness before swelling of at most 1 mil (0.025 mm), with more than 90% of the pore volume of the membrane filled with a perfluoro ionomer to render it at least substantially occlusive and that is capable of swelling without deterioration of mechanical properties.

SUMMARY OF THE INVENTION

An ultra-thin integral composite membrane is provided including a porous polymeric membrane having a structure of micropores of polymer with a porosity of greater than 35%, an average pore diameter of less than 10 microns and a thickness of at most 0.025 mm and a perfluoro ion exchange polymer impregnated within the micropores so as to render the micropores substantially occlusive, wherein the composite membrane is impermeable to gases and liquids and is substantially free of pinholes. Porous polymeric membranes suitable for this invention include membranes made of perfluoroalkyloxy resin, fluorinated ethylene propylene, polyolefins, polyamides, cellulosics, polycarbonates and, fluorinated and chlorinated polymers. Perfluoro ion exchange materials suitable for use with this invention include perfluorinated sulfonic acid resin, perfluorinated carboxylic add resin, polyvinyl alcohol, divinyl benzene, and styrene based polymers. A reinforcement backing may also be provided.

Methods for making the ultra-thin integral composite membranes are also provided.

DETAILED DESCRIPTION OF THE INVENTION

An ultra-thin composite membrane is provided and includes a base material of microporous membrane with a thickness less than 1 mil (0.025 mm) having a microstructure of micropores and perfluoro ion exchange resin that substantially impregnates the microporous membrane so as to occlude the micropores. The ultra-thin composite membrane may be employed in many different types of applications including for example, chemical separation, electrolysis in fuel cells and batteries, pervaporation, gas separation, dialysis separation, industrial electrochemistry such as chlor-alkali, and other electrochemical devices, catalysis as a super acid catalyst and use as a medium of in enzyme immobilization.

The ultra-thin composite membrane is mechanically strong and is substantially and uniformly pore occlusive so that it is particularly useful as an ion exchange material. Ultra-thin is hereby defined as 1 mil (0.025 mm) or less. Uniform is hereby defined as continuous impregnation with the ion exchange material so that no pin holes or other discontinuities exist within the composite structure. In addition, pore occlusive is hereby defined as pores being substantially impregnated (i.e., at least 90%) with the perfluoro ion exchange material rendering the final material air impermeable with a Gurley number of infinity.

Figure 3:
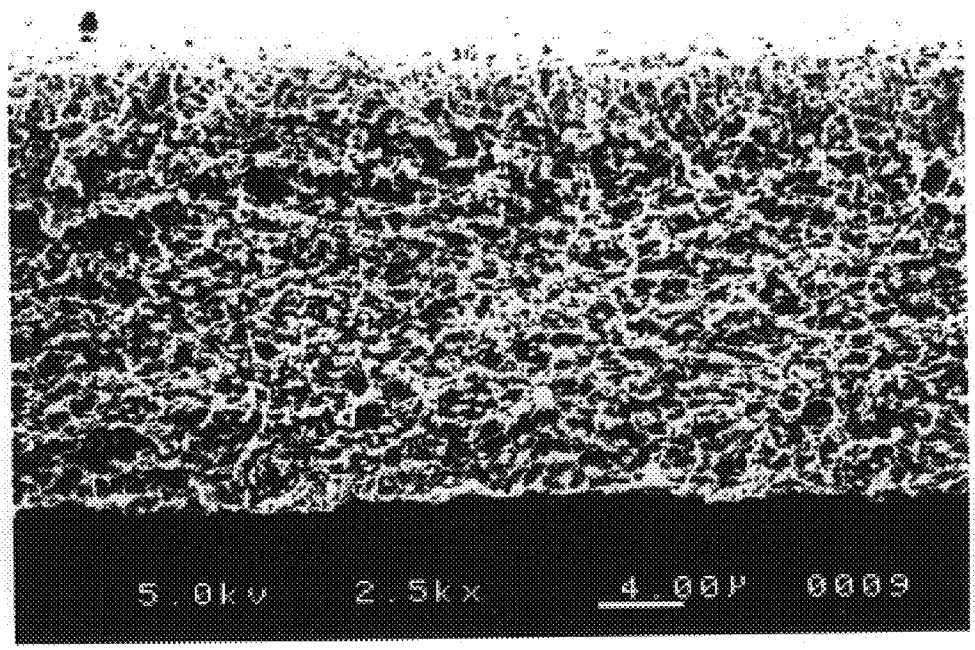
FIG. 3 is a photomicrograph of a cross-section of expanded PTFE that has not been treated with any ion exchange material at a magnification of 2.5 kX.

The microporous membrane which serves as the base material for the composite has a porosity of greater than 35% and preferably has a porosity of between 70–95%. The pores of the microstructure have a diameter less than 10 $\mu$m, are preferably between 0.05 and 5 $\mu$m, and are most preferably about 0.2 $\mu$m. The thickness of the membrane is at most 1 mil (0.025 mm) preferably between 0.06 mils (0.19 $\mu$m) and 0.8 mils (0.02 mm), and most preferably between 0.50 mils (0.013 mm) and 0.75 mils (0.019 mm). Materials from which this microporous membrane can be made include for example, perfluoroalkyloxy (PFA), fluorinated ethylene propylene (FEP), polyolefins, polyamides, cellulosics, polycarbonates and, fluorinated and/or chlorinated polymers, and. A most preferred material is expanded porous polytetrafluoroethylene (PTFE) made in accordance with the teachings of U.S. Pat. No. 3,593,566 herein incorporated by reference. This material is commercially available in a variety of forms from W. L. Gore & Associates, In., of Elkton, MD, under the trademark GORE-TEX®. The expanded PTFE membrane can be made in a number of thicknesses ranging from 0.00025 inches to 0.125 inches (6 $\mu$m to 3 mm) with the preferred thickness for the present invention being at most 1 mil (0.025 mm) and most preferably between 0.50 mils (0.013 mm) and 0.75 mils (0.019 mm). The expanded PTFE membrane can be made with porosities ranging from 20% to 98%, with the preferred porosity for the present invention being 70–95%. FIG. 3 shows a photomicrograph of the internal microstructure of expanded PTFE used as the base material.

An ion exchange material dissolved in a solvent and mixed with a surfactant is uniformly applied so as to impregnate and occlude the micropores of the base material. Suitable ion exchange materials include for example, perfluorinated sulfonic acid resin, perfluorinated carboxylic acid resin, polyvinyl alcohol, divinyl benzene, styrene-based polymers and metal salts with or without a polymer. A mixture of these ion exchange materials may also be employed in treating a membrane. Solvents that are suitable for use with the ion exchange material include for example, alcohols, carbonates, THF (tetrahydrofuran), water, and combinations thereof.

A surfactant having a molecular weight of greater than 100 must be employed with the ion exchange material to ensure impregnation of the pores. Surfactants or surface active agents having a hydrophobic portion and a hydrophilic portion may be utilized. Preferable surfactants are those having a molecular weight of greater than 100 and may be classified as anionic, nonionic, or amphoteric which may be hydrocarbon or fluorocarbon-based and include for example, Merpol®, a hydrocarbon based surfactant or Zonyl®, a fluorocarbon based surfactant, both commercially available from E. I. DuPont de Nemours, Inc. of Wilmington, Del.

A most preferred surfactant is a nonionic material, octylphenoxy polyethoxyethanol having a chemical structure:

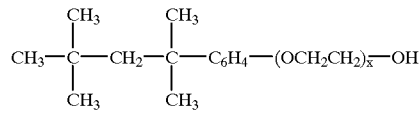

where x = 10 (average)

known as Triton® X100, commercially available from Rohm & Haas of Philadelphia, Pa.

Figure 1:
FIG. 1 is a schematic cross-section of the composite membrane that is fully impregnated with the ion exchange material.
Figure 4:
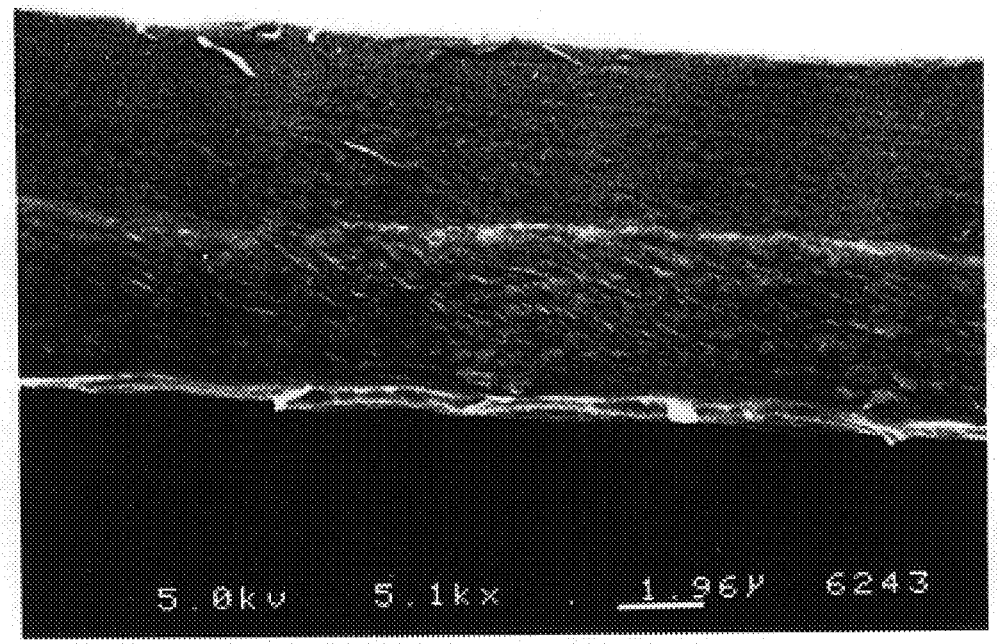
FIG. 4 is a photomicrograph of a cross-section of expanded PTFE fully impregnated with an ion exchange material at a magnification of 5.1 kX.

FIG. 1 shows a schematic view of the composite membrane with ion exchange material 2 and the base material 4 so that the micropores of the interior of the base material 4 are fully impregnated. The final composite membrane has a uniform thickness free of any discontinuities or pinholes on the surface. The micropores of the membrane are 100% occluded thus causing the composite membrane to be impermeable to liquids and gases. FIG. 4 shows a scanning electron photomicrograph of this composite membrane.

Alternatively, the ion exchange material and surfactant mixture 2 may be applied to the membrane 4 so that most of the pores are uniformly treated rendering the membrane substantially impregnated with the ion exchange material. The composite membrane is still free of any discontinuities or pinholes.

Figure 2:
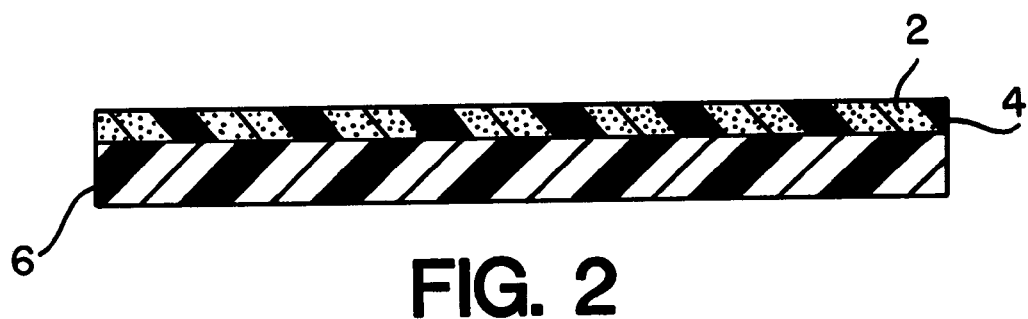
FIG. 2 is a schematic cross-section of the composite membrane that is fully impregnated with the ion exchange material and has a backing material attached thereto.

Optionally, and as shown schematically in FIG. 2, the composite membrane may be reinforced with a woven or non-woven material 6 bonded to one side of the membrane. Suitable woven materials include for example, scrims made of woven fibers of expanded porous polytetrafluoroethylene, commercially available from W. L. Gore & Associates, Inc., of Elkton, Md.; webs made of extruded or oriented polypropylene netting commercially available from Conwed, Inc. of Minneapolis, Minn.; and woven materials of polypropylene and polyester of Tetko Inc., of Briarcliff Manor, N.Y. Suitable non-woven materials include for example, a spun-bonded polypropylene commercially available from Reemay Inc. of Old Hickory, Tenn.

The treated membrane may then be further processed to remove the surfactant with the use of various low molecular weight alcohols. This is accomplished by soaking or submerging the membrane in a solution of, for example, water, isopropyl alcohol, methanol and/or glycerin. During this step, the surfactant which was originally mixed in solution with the perfluoro ion exchange material is removed. Slight swelling of the membrane occurs. The perfluoro ion exchange material remains within the pores of the base material as it is not soluble in the lower molecular weight alcohol.

The membrane is further treated by boiling in a suitable swelling agent, preferably water causing it to then slightly swell in the x and y direction. Additional swelling occurs in the z-direction. A composite membrane results having a higher ion transport rate (at least 20 times higher than in its unswollen state) that is also strong. The swollen membrane retains its mechanical integrity unlike the membranes consisting only of the perfluoro ion exchange material and simultaneously maintains desired ionic transport characteristics. A correlation exists between the content of the swelling agent within the membrane structure and transport properties of the membrane. A swollen membrane will transport chemical species faster than an unswollen membrane.

Although the membrane has excellent long term chemical stability, it can be susceptible to poison by organics. The organics can be removed by regeneration in which the membrane is boiled in a strong acid such as nitric or chromic acid.

To prepare the inventive membrane, a support structure such as a polypropylene woven fabric may first be laminated to the untreated base membrane by any conventional technique including hot roll lamination. ultrasonic lamination, adhesive lamination, forced hot air lamination so long as the technique does not damage the integrity of the membrane. A solution is prepared containing a perfluorosulfonic acid resin in solvent mixed with one or more surfactants. The solution may be applied to the membrane by any conventional coating technique including forwarding roll coating, reverse roll coating, gravure coating, doctor coating, kiss coating, as well as dipping, brushing, painting, and spraying so long as the liquid solution is able to penetrate the interstices and micropores of the base material. Excess solution from the surface of the membrane may be removed. The treated membrane is then immediately placed into an oven to dry. Oven temperatures may range from 60–200° C., preferably 120–160° C. so as to lock the perfluoro ion polymer inside the membrane and prevent it from migrating to the surface during drying. This step may be repeated until the membrane becomes completely transparent. Typically between 2 to 8 treatments are required but the actual number of treatments is dependent on the surfactant concentration and thickness of the membrane. If the membrane is prepared without a support structure, both sides of the membrane may be treated simultaneously thereby reducing the number of treatments required.

The oven treated membrane is then soaked in a low molecular weight alcohol, as described above to remove the surfactant. The membrane is then boiled as described above in a swelling agent under pressure ranging from 0 to 20 atmospheres absolute thereby increasing the amount of swelling agent the treated membrane is capable of holding.

Alternatively, the ion exchange material may be applied to the membrane without the use of a surfactant. This procedure requires additional exposure to the perfluoro ion exchange resin but does not then need to be soaked in alcohol. A vacuum may also be used to draw the ion exchange material into the membrane.

Another alternative to the process of preparing the inventive membrane involves the selection and use of a surfactant having low water solubility with the perfluoro ion solution. Surfactants with low water solubility include Zonyl® FSO.

a fluorocarbon based surfactant commercially available from E. I. DuPont de Nemours, Inc. By using this type of surfactant, the heat treatment step may be eliminated. The resulting ion exchange treated membrane made by this process may be used for different aqueous applications and other chemical environments without any effect due to the surfactant.

Because the base membrane is exceptionally thin (at most 1 mil) (0.025 mm) with the resulting composite membrane being very thin and only marginally distorted in the x and y directions, it is able to selectively transport ions at a faster rate than heretofore has been achieved with only a slight lowering of the selectivity characteristics of the membrane.

The following testing procedures were employed on the samples prepared as described in the examples described below.

TEST PROCEDURES
AIR PERMEABILITY—Gurley Number Method

The resistance of samples to air flow was measured by a Gurley densometer (ASTM D726-58) manufactured by W. & L. E. Gurley & Sons. The results were reported in terms of Gurley Number defined as the time in seconds for 100 cubic centimeters of air to pass through 1 square inch (6.45 sq. cm.) of a test sample at a pressure drop of 4.88 inches (12.4 cm.) of water.

STRENGTH MODULUS

Strength testing was carried out on an Instron Model 1122. Samples were one inch wide. Gauge length (distance between clamps) was two inches (5.08 cm.). Samples were pulled at a rate of 500% per minute. The cross head speed was 20 inches per minute.

THICKNESS

Thickness of the base material was determined with the use of a snap gauge (Johannes Kafer Co. Model No. F1000/302). Measurements were taken in at least four areas of each specimen. Thickness of the dried composite membrane were also obtained with the use of the snap gauge. Thicknesses of swollen samples were not measurable due to the compression or residual water on the surface of the swollen membrane with the snap gauge. Thickness measurements of the swollen membrane were also not able to be obtained with the use of scanning electron microscopy due to interferences with the swelling agents.

MOISTURE VAPOR TRANSMISSION RATE (MVTR)
Potassium Acetate Method

Moisture vapor transmission rates were determined by the following procedure. Approximately 70 ml. of a solution consisting of 35 parts by weight of potassium acetate and 15 parts by weight of distilled water was placed into a 133 ml. polypropylene cup, having an inside diameter of 6.5 cm. at its mouth. An expanded polytetrafluoroethylene (PTFE) membrane having a minimum MVTR of approximately 85,000 g/m$^2$-24 hr as tested by the method described in U.S. Pat. No. 4,862,730 to Crosby and available from W. L. Gore & Associates, Inc. of Newark, Delaware, was heat sealed to the lip of the cup to create a taut, leakproof, microporous barrier containing the solution.

A similar expanded PTFE membrane was mounted to the surface of a water bath. The water bath assembly was controlled at 23° C. plus or minus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 10 minutes and the cup assembly was then removed, weighed again within 1/1000 g.

The MVTR of the sample was calculated from the weight gain of the cup assembly and was expressed in grams of water per square meter of sample surface area per 24 hours.

PEEL STRENGTH

Peel strength or membrane adhesion strength tests were conducted on samples prepared with reinforced backings. Test samples were prepared having dimensions of 3 inch by 3.5 inch (7.62 cm×8.89 cm). A 4 inch by 4 inch (10.2 cm×10.2 cm) chrome steel plate with an Instron tensile test machine Model No. 1000 were also used. Double coated vinyl tape (3M -#419) 1 inch (2.54 cm) wide was placed over the edges of the chrome plate so that tape covered all edges of the plate.

The sample material was then mounted on top of the adhesive exposed side of the tape and pressure was applied so that sample was secured.

The plate and sample were then installed in the Instron in a horizontal position. The upper crosshead was lowered so that the jaws of the machine closed flat and tightened upon the sample. The upper crosshead was then slowly raised pulling the layer of perfluoro ion material from the reinforced backing. When the composite membrane had been detached from the reinforced backing, the test was complete. Adhesion strength was estimated from the average strength needed to pull the composite membrane from the reinforced backing.

ELECTRICAL CONDUCTANCE

The electrical conductance in the Z-direction (otherwise known as through conductance) was measured. A sample of swollen composite membrane (cut to a 1 inch diameter circle) was placed between two 0.680 inch (1.73 cm) diameter copper contacts. A 5 lb. (2268 g) weight was placed above the top contact. The contacts were connected to a Hewlett Packard Model 3478A multimeter. The resistance was then read. Prior to this measurement, the thickness of the dried preswollen composite membrane was determined as described above. Conductance was calculated according to the formula:

C=1/R wherein R=resistance measured in ohms
C=conductance measured in mhos

IONIC CONDUCTION RATE

The composite membrane was tested to measure the ionic conduction rate in terms of micromhos per minute. This test was performed with two 900 ml. compartments between which the treated membrane was placed. The exposed surface area of membrane was 7.07 sq in. (45.65 sq cm). One compartment (the retentate side) was filled with 1 M NaCl solution. The other side (the permeate side) was filled with pure distilled water. Both compartments were stirred continuously and at the same speed with two electric mixers using polypropylene impellors. The conductance of the permeate side was recorded every 5 minutes for an hour with a hand-held conductivity meter, Omega Model No. PHH80. The total ionic conduction rate was determined by taking the average slope of a graph of conductance over time.

LINEAR EXPANSION TESTS

The percentage swelling in the x- and y-directions were determined. The length and width of the composite membranes were first measured with a Mitutoyo Model # 505-627-50 caliper prior to boiling and swelling. Final measurements were taken after the samples were boiled and swelled. Percent linear expansion were then calculated for both the x- and y-directions.

WEIGHT CHANGE

The percent weight change on samples was also prepared. Here composite membranes were weighed prior to boiling and swelling and then after swelling. All weight measurements were taken with Mettler Balance, Model No. AT400. The percent weight change was then calculated.

EXAMPLE 1

A sample of expanded polytetrafluoroethylene membrane made in accordance with the teachings of U.S. Pat. No. 3,593,566, herein incorporated by reference. The membrane, with a nominal thickness of 0.75 mils (0.02 mm) and a 0.2 micrometer pore size, was mounted on a 6 inch wooden embroidery hoop. A solution was prepared comprising 95% by volume of a perfluorosulfonic acid/tetra-fluoroethylene copolymer resin (in H+form) in a solution of low molecular weight alcohols comprising propanol, butanol, and methanol known as Nafion NR-50 (1100 EW) commercially available from E. I. DuPont de Nemours, Inc. and 5% of a nonionic surfactant of octyl phenoxy poly ethoxyethanol known as Triton X100 commercially available from Rohm & Haas of Philadelphia, Pa. This solution was brushed on both sides of the membrane so as to impregnate and substantially occlude the micropore structure. The sample was then dried in the oven at 140° C. for 30 seconds. The procedure was repeated two more times to fully occlude the micropores. The sample was then soaked in isopropanol for 5 minutes to remove the surfactant. After rinsing with distilled water and allowing to dry at room temperature, a final coat of the Nafion-surfactant solution as described above was applied. The wet membrane was again dried in the oven at 140° C. for 30 seconds and soaked in isopropanol for 2 minutes. The membrane was finally boiled in distilled water for 10 minutes under atmospheric pressure to swell the treated membrane. Gurley numbers for this material are summarized in Table 3. Ionic conductive rates are summarized in Table 4. The strength modulus may be found in Table 5; percent linear expansion may be found in Table 6; and percent weight change of this sample may be found in Table 7. The swollen membrane was later dried to a dehydrolyzed state in an oven at 140° C. for 30 seconds. The thickness of the dried composite membrane was measured and found to be approximately the same thickness as the base material.

EXAMPLE 2

A sample of expanded porous PTFE membrane made in accordance with the teachings of U.S. Pat. No. 3,593,566 having a pore size of 0.2 micrometers and nominal thickness of 0.75 mils (0.02 mm) and a Gurley Densometer air flow of 2–4 seconds was placed on top of a netting of polypropylene obtained from Conwed Plastics Corp. of Minneapolis, Minn. The two materials were bonded together on a laminator with 10 psig pressure, a speed of 15 feet per minute and a temperature of 200° C. No adhesives were used. The reinforced membrane sample was then placed on a 6 inch wooden embroidery hoop. A solution of 96% by volume of a perfluorosulfonic acid TFE copolymer resin in alcohol Nafion NR-50 (1100 EW) commercially available from E. I. DuPont de Nemours, Inc. and 4% of the nonionic surfactant Triton X-100 obtained from Rohm & Haas was prepared. This solution was brushed on the membrane side only to substantially occlude the micropores and the sample was dried in an oven at 130° C. This procedure was repeated three more times to fully occlude the micropores. The sample was then baked in an oven at 140° C. for 5 minutes. The sample was soaked in isopropanol for 5 minutes to remove the surfactant. The membrane was then boiled in distilled water for 30 minutes under atmospheric pressure causing the treated membrane to swell. Gurley numbers for this material are summarized in Table 3.

This sample was tested for its peel strength in accordance with the method described above. The linear bond strength was found to be 2.06 lb./sq. in. (1450 kg/m$^2$).

EXAMPLE 3

A sample of expanded porous polytetrafluoroethylene membrane made in accordance with the teachings of U.S. Pat. No. 3,593,566, having a thickness of 0.5 mils (0.01 mm) with a pore size of 0.2 micrometer was mounted on a 6 inch wooden embroidery hoop. A solution of 100% Nafion resin solution, perfluorosulfonic acid/TFE copolymer resin in a solvent mixture of propanol, butanol, and methanol known commercially from E. I. DuPont de Nemours, Inc. as Nafion® solution NR-50 (1100 EW) without the addition of any surfactants was brushed onto both sides of the membrane to substantially occlude the micropores. The sample was then placed in an oven at 160° C. to dry. This procedure was repeated four more times until the membrane was completely transparent and the micropores were fully occluded. The sample was then boiled in distilled water for 30 minutes at atmospheric pressure causing the membrane to swell. Gurley numbers for this material are summarized in Table 3. The electrical conductivity was measured and summarized in Table 2.

EXAMPLE 4

A sample of expanded porous polytetrafluoroethylene membrane made in accordance with the teachings of U.S. Pat. No. 3,593,566 having a thickness of 0.5 mils (0.01 mm) and a pore size 0.2 micrometers was mounted on a 6 inch wooden embroidery hoop. A solution of 99% by volume Nafion NR-50 commercially available from E. I. DuPont de Nemours, Inc. and 1% surfactant mixture was prepared. The surfactant mixture consisted of 50% of a nonionic surfactant, Triton X-100 commercially available from Rohm & Haas Corp. and 50% Zonyl FSO commercially available from E. I. DuPont de Nemours, Inc. This solution was brushed on both sides of the membrane and was allowed to dry at room temperature. This procedure was repeated 4 more times until the sample was completely transparent and to fully occlude the micropores. The sample was not treated so as to remove the surfactant. The composite membrane was boiled in distilled water for 5 minutes causing the membrane to swell. The Gurley number for this material is summarized in Table 3.

EXAMPLE 5

A sample of expanded porous polytetrafluoroethylene membrane made in accordance with the teachings of U.S. Pat. No. 3,593,566, having a thickness of 0.5 mils (0.01 mm) with a pore size of 0.2 micrometer was mounted onto a 6 inch wooden embroidery hoop. A solution of 95% by volume Nafion NR-50 (1100 EW) commercially available from E. I. DuPont de Nemours, Inc. and 5% of a nonionic surfactant, Triton X-100 commercially available from Rohm & Haas was prepared. The solution was brushed on both sides of the membrane with a foam brush and the excess was wiped off. The wet membrane was dried in an oven at 140° C. for 30 seconds. Three additional coats of solution were applied to the membrane in the same manner to fully occlude the micropores. The membrane was then soaked in isopropanol for 2 minutes to remove the surfactant. The membrane was rinsed with distilled water and allowed to dry at room temperature. A final treatment of the Nafion-Triton solution was applied. The wet membrane was dried in the oven at 140° C. for 30 seconds, then soaked in isopropanol for 2 minutes. Finally, the membrane was boiled in distilled water for 5 minutes. Moisture vapor transmission rates for the treated membrane were measured and are summarized in Table 1. The Gurley number of the treated membrane are summarized in Table 3.

EXAMPLE 6

A sample of expanded porous polytetrafluoroethylene membrane made in accordance with the teachings of U.S. Pat. No. 53,593,566, having a nominal thickness of 0.75 mils (0.02 mm) and a pore size of 0.2 micrometers was mounted onto a 6 inch wooden embroidery hoop. The Gurley Densometer air flow on this membrane was 2–4 seconds. A solution of 95% by volume Nafion NR-50 (1100 EW) commercially available from E. I. DuPont de Nemours, Inc. and 5% Triton X-100 non-ionic surfactant from Rohm & Haas was prepared. The solution was brushed on both sides of the membrane with a foam brush and the excess was wiped off. The wet membrane was dried in the oven at 140° C. for 30 seconds. Three additional coats of solution were applied in the same manner. The membrane was then soaked in isopropanol for 2 minutes. After rinsing with distilled water and allowing to dry at room temperature, a final coat of the Nafion surfactant solution was applied. The wet membrane was dried in the oven at 140° C. for 30 seconds, then soaked in isopropanol for 2 minutes. This material was not boiled. No swelling other than the minor swelling during the surfactant removal occurred. The ionic conduction rate for this material is presented in Table 4.

EXAMPLE 7

A sample of expanded porous polytetrafluoroethylene membrane made in accordance with the teachings of U.S. Pat. No. 3,593,566, having a nominal thickness of 0.75 mils (0.02 mm) and a pore size of 0.2 micrometers was mounted onto a 5 inch plastic embroidery hoop. The Gurley Densometer air flow on this membrane was 2–4 seconds. A solution of 95% by volume Nafion NR-50 (1100 EW) commercially available from E. I. DuPont de Nemours, Inc. and 5% Triton X-100 non-ionic surfactant from Rohm & Haas was prepared. The solution was brushed on both sides of the membrane with a foam brush and the excess was wiped off. The wet membrane was dried in the oven at 140° C. for 30 seconds. Two additional coats of solution were applied in the same manner so as to fully occlude the micropores. The membrane was then soaked in isopropanol for 2 minutes. After rinsing with distilled water and allowing to dry at room temperature, a final coat of the same Nafion NR-50 Triton X-100 solution was applied. The wet membrane was dried in the oven at 140° C. for 30 seconds and then soaked in isopropanol for 2 minutes to remove the surfactant. The sample was rinsed and dried at room temperature. No boiling occurred.

This sample was weighed before it was mounted on the 5 inch plastic hoop. Following treatment, it was removed from the hoop and weighed again. The ion exchange polymer content was directly calculated by determining the weight change before and after treatment. The ion exchange content for this sample was found to be 98.4 mg or 9.81 grams per square meter of membrane. A sample of Nafion 115 (5 mils, 0.13 mm) commercially available from E. I. DuPont de Nemours, Inc. was cut to a 1 inch (25.4 mm) by 1 inch (25.4 mm) sample, weighed and found to be 216 grams per square meter.

Nafion Comparative Samples

Nafion 117, a perfluorosulfonic acid cation exchange membrane, unreinforced film of 1100 equivalent weight commercially available from E. I. DuPont de Nemours Co., Inc., having a quoted nominal thickness of 7 mils (0.18 mm) was obtained. The samples, originally in the hydrated swollen state were measured in the x- and y-directions and weighed. The samples were then dried in a convention oven at 140° C. for approximately one minute to an unswollen state and then remeasured from which expansion and weight change measurements found in Tables 6 and 7 were calculated. Nafion 115, a perfluorosulfonic acid cation exchange membrane, unreinforced film of 1100 equivalent weight also commercially available from E. I. DuPont de Nemours, Inc., having a nominal thickness of 5 mils (0.1 mm) was obtained. This sample was also obtained commercially in the hydrated swollen state.

TABLE 1

Moistum Vapor Transmission Rates (MVTR)

| Sample ID* | MVTR (grams/m$^2$-24 hrs. |
|---|---|
| 5 | 25,040 |
| Nafion 117 | 23,608 |

*Measurements were obtained on samples in their swollen state.

TABLE 2

Electrical Conductaner

| Sample ID* | Conductaner (micrombos) |
|---|---|
| 3 | 1,277 |
| Nafion 117 | 1,214 |

*Measurements were obtained on samples in their swollen state.

TABLE 3

Gurley Numbers

| Sample ID | Thickness (mm)* | Base Material Gurley No. (sec) | Final Swollen Membrane Gurley Number (sec) |
|---|---|---|---|
| 1 | 0.02 | 2–4 | Total occlusion |
| 2 | 0.02 | 2–4 | Total occlusion |
| 3 | 0.01 | 2–4 | Total occlusion |
| 4 | 0.01 | 2–4 | Total occlusion |
| 5 | 0.01 | 2–4 | Total occlusion |

*Thickness measurements were obtained on samples prior to swelling in dried state.

TABLE 4

Ionic Conduction Rate

| Sample ID | Ionic Conduction Rate (micromhos/minute) |
|---|---|
| 1 | 119 (swollen) |

TABLE 4-continued

Ionic Conduction Rate

| Sample ID | Ionic Conduction Rate (micromhos/minute) |
|---|---|
| 6 | 5.1 (unswollen) |
| Nafion 115 | 15.9 (swollen) |

TABLE 5

Strength Modulus

| Sample ID | Thickness (mm) | Strength Modulus (lb per dry sq. in.)** |
|---|---|---|
| 1 | 0.02* | 15150 |
| Nafion 117 | 0.13 | 12750 |

*Thickness measurements were obtained prior to swelling in dried state.
**Strength modulus measurements were obtained in the swollen state.

TABLE 6

Percent Linear Expansion

| Sample ID | Unswollen (x) (mm) | Swollen (x) (mm) | Average % Expansion in x-direction | Unswollen (y) (mm) | Swollen (y) (mm) | Average % Expansion in y-direction |
|---|---|---|---|---|---|---|
| 1 | 124.4 | 124.4 | — | 123.3 | 123.3 | — |
| Nafion 117 | 125.5 | 137.7 | +9.7 | 127.3 | 149.7 | +17 |

TABLE 7

Percent Weight Change

| Sample ID | Unswollen wt (g) | Swollen wt (wet) (g) | % weight change (wet) |
|---|---|---|---|
| 1 | 0.2515 | 1.0273 | +308% |
| Nafion 117 | 5.5700 | 7.5106 | +35% |

We claim:

1. An integral air impermeable composite membrane comprising:
   a polymeric support having a microstructure of micropores, said microstructure defining a porosity in the range of about 70% to 98% within said polymeric support,
   at least one ion exchange resin filling said microstructure such that said composite membrane is air impermeable, said composite membrane having a thickness of at most 0.8 mils and an ionic conduction rate of at least 5.1 μmhos/min.

2. The composite membrane of claim 1, wherein said polymeric support is a polyolefin.

3. The composite membrane of claim 1, wherein said polymeric support is a fluorinated polymer.

4. The composite membrane of claim 3, wherein said fluorinated polymer is polytetrafluoroethylene.

5. The composite membrane of claim 4, wherein said polytetrafluoroethylene is expanded polytetrafluoroethylene.

6. The composite membrane of claim 4, wherein said microstructure includes nodes interconnected with fibrils.

7. The composite membrane of claim 3, wherein said microstructure includes nodes interconnected with fibrils.

8. The composite membrane of claim 1, wherein said polymeric support is a chlorinated polymer.

9. The composite membrane of claim 1, wherein said polymeric support is a polyamide.

10. The composite membrane of claim 1, wherein said polymeric support is a polycarbonate.

11. The composite membrane of claim 1, wherein the thickness of said composite membrane is in the range of between 0.06 and 0.8 mils.

12. The composite membrane of claim 11, wherein the thickness of said composite membrane is at most 0.4 mils.

13. The composite membrane of claim 11, wherein the thickness of said composite membrane is at most 0.3 mils.

14. The composite membrane of claim 11, wherein the thickness of said composite membrane is at most 0.2 mils.

15. The composite membrane of claim 11, wherein the thickness of said composite membrane is at most 0.1 mils.

16. The composite membrane of claim 1, wherein the thickness of said composite membrane is in the range of between about 0.5 and 0.8 mils.

17. The composite membrane of claim 1, wherein the thickness of said composite membrane is at most 0.5 mils.

18. The composite membrane of claim 1, wherein said at least one ion exchange resin comprises a mixture of ion exchange resins.

19. The composite membrane of claim 18, wherein said mixture of ion exchange resins includes at least two of a perfluorinated sulfonic acid resin, a perfluorinated carboxylic acid resin, a polyvinyl alcohol resin, a divinyl benzene resin or a styrene-based polymer.

20. The composite membrane of claim 1, wherein said at least one ion exchange resin comprises a perfluorinated sulfonic acid resin.

21. The composite membrane of claim 1, wherein said at least one ion exchange resin comprises a perfluorinated carboxylic acid resin.

22. The composite membrane of claim 1, wherein said at least one ion exchange resin comprises a polyvinyl alcohol.

23. The composite membrane of claim 1, wherein said at least one ion exchange resin comprises a divinyl benzene resin.

24. The composite membrane of claim 1, wherein said at least one ion exchange resin comprises a styrene-based polymer.

25. The composite membrane of claim 1, wherein said at least one ion exchange resin further comprises metal salts with or without a polymer.

26. The composite membrane of claim 1, wherein said at least one ion exchange resin is a perfluorosulfonic acid/tetrafluoroethylene copolymer resin.

27. The composite membrane of claim 1, further comprising a reinforcement backing bonded to a side thereof.

28. The composite membrane according to claim 1, wherein the ionic conduction rate is measured with two 900 mL compartments between which the membrane is placed, wherein the exposed surface area of the membrane is 7.07 square inches, wherein one compartment is filled with 1 M sodium chloride solution and the other compartment, the permeate compartment, is filled with pure distilled water, wherein both compartments are stirred continuously and at the same speed with two electric mixers, wherein the conductance of the permeate compartment is recorded every five minutes for an hour, and wherein the ionic conduction rate is determined by taking an average slope of a graph of conductance of the permeate compartment over time.

29. An integral air impermeable composite membrane comprising:
- a polymeric support having a microstructure of micropores, said microstructure defining a porosity in the range of about 70% to 98% within said support,
- at least one ion exchange resin filling said microstructure such that said composite membrane is air impermeable, said composite membrane having a thickness of at most 0.8 mils.

30. The composite membrane of claim 29, wherein the thickness of said composite membrane is in the range of between 0.06 and 0.8 mils.

31. The composite membrane of claim 29, wherein the thickness of said composite membrane is in the range of between about 0.5 and 0.8 mils.

32. The composite membrane of claim 29, wherein the thickness of said composite membrane is at most 0.5 mils.

33. The composite membrane of claim 29, wherein said at least one ion exchange resin comprise a mixture of ion exchange resins.

34. The composite membrane of claim 29, wherein said at least one ion exchange resin further comprises metal salts with or without a polymer.

35. An substantially air occlusive integral composite membrane having a polymeric support with a microstructure of pores, said microstructure filled with an ion exchange resin, said composite membrane has an ionic conduction rate of at least 5.1 $\mu$mhos/min, said composite membrane prepared by,
- (a) providing a polymeric support having a microstructure of micropores;
- (b) applying an ion exchange resin solution to said polymeric support; and
- (c) repeating step (b) until said micropores are sufficiently filled with ion exchange resin to form an air occlusive integral composite membrane.

36. The composite membrane of claim 35, wherein said step (b) further includes,
- (b1) drying said support after each application of ion exchange resin solution to remove solvent from said solution.

37. The composite membrane of claim 36, wherein said ion exchange resin solution is applied in the presence of a surfactant.

38. The composite membrane of claim 35, wherein said step (b) includes at least three successive applications of said ion exchange resin solution.

39. The composite membrane of claim 35, wherein said step (b) includes at least four successive applications of said ion exchange resin solution.

40. The composite membrane of claim 35, wherein said step (b) includes at least three successive applications of said ion exchange resin solution, each followed by a drying step.

41. The composite membrane of claim 40, wherein said drying is conducted at about room temperature.

42. The composite membrane of claim 35, wherein said step (b) includes at least four successive applications of said ion exchange resin solution, each followed by a drying step.

43. The composite membrane of claim 35, wherein said support comprises a polyolefin.

44. The composite membrane of claim 35, wherein said support comprises a fluorinated polymer.

45. The composite membrane of claim 44, wherein said fluorinated polymer is polytetrafluoroethylene.

46. The composite membrane of claim 45, wherein said polytetrafluoroethylene is expanded polytetrafluoroethylene.

47. The composite membrane of claim 44, where said microstructure includes nodes interconnected with fibrils.

48. The composite membrane of claim 35, wherein said support comprises a chlorinated polymer.

49. The composite membrane of claim 35, wherein said support comprises a polyamide.

50. The composite membrane of claim 35, wherein said support comprises a polycarbonate.

51. The composite membrane of claim 35, having a thickness in the range between 0.06 and 0.8 mils.

52. The composite membrane of claim 51, having a thickness in the range of between about 0.5 and at most 0.8 mils.

53. The composite membrane of claim 51, having a thickness of at most about 0.5 mils.

54. The composite membrane of claim 51, wherein the thickness of said composite membrane is at most 0.4 mils.

55. The composite membrane of claim 51, wherein the thickness of said composite membrane is at most 0.3 mils.

56. The composite membrane of claim 51, wherein the thickness of said composite membrane is at most 0.2 mils.

57. The composite membrane of claim 51, wherein the thickness of said composite membrane is at most 0.1 mils.

58. The composite membrane of claim 35, wherein said ion exchange resin is a mixture of resins.

59. The composite membrane of claim 35, wherein said ion exchange resin is a perfluorinated sulfonic acid resin.

60. The composite membrane of claim 35, wherein said ion exchange resin solution is applied in the presence of a surfactant.

* * * * *

UNITED STATES PATENT AND TRADEMARK OFFICE
Certificate

Patent No. 6,254,978

Patented: July 3, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bamdad Bahar, Chester, MD; Alex R. Hobson, Elkton, MD; Jeffrey A. Kolde, Avondal, PA; and Robert S. Mallouk, Chadds Ford, PA.

Signed and Sealed this Seventeenth Day of December 2002.

TERRELL MORRIS
*Supervisory Patent Examiner*
Art Unit 1771

(12) EX PARTE REEXAMINATION CERTIFICATE (5963rd)
United States Patent
Bahar et al.

(10) Number: US 6,254,978 C1
(45) Certificate Issued: *Oct. 23, 2007

(54) ULTRA-THIN INTEGRAL COMPOSITE MEMBRANE

(75) Inventors: Bamdad Bahar, Chester, MD (US);
Alex R. Hobson, Elkton, MD (US);
Jeffrey A. Kolde, Avondal, PA (US);
Robert S. Mallouk, Chadds Ford, PA (US)

(73) Assignee: W. L. Gore & Associates, Inc., Newark, DE (US)

Reexamination Request:
No. 90/006,312, Jun. 19, 2002

Reexamination Certificate for:
Patent No.: 6,254,978
Issued: Jul. 3, 2001
Appl. No.: 09/209,932
Filed: Jul. 8, 1998

(*) Notice: This patent is subject to a terminal disclaimer.

Certificate of Correction issued Dec. 17, 2002.

Related U.S. Application Data

(63) Continuation of application No. 08/903,844, filed on Jul. 31, 1997, now abandoned, which is a continuation of application No. 08/339,425, filed on Nov. 14, 1994, now abandoned.

(51) Int. Cl.
*B32B 5/18* (2006.01)
*H01M 8/10* (2006.01)
*C08J 5/20* (2006.01)
*C08J 5/22* (2006.01)
*C25B 13/08* (2006.01)

(52) U.S. Cl. ............................ 428/305.5; 210/500.36; 428/308.4; 428/422

(58) Field of Classification Search ............ None
See application file for complete search history.

(56) References Cited

U.S. PATENT DOCUMENTS

| | | |
|---|---|---|
| 2,393,967 A | 2/1946 | Brubaker |
| 2,559,752 A | 7/1951 | Berry |
| 2,593,583 A | 4/1952 | Lontz |
| 2,681,319 A | 6/1954 | Bodamer |
| 2,827,426 A | 3/1958 | Bodamer |
| 2,951,818 A | 9/1960 | Haagen |
| 2,965,697 A | 12/1960 | Duddy |
| 3,041,317 A | 6/1962 | Gibbs et al. |
| 3,214,501 A | 10/1965 | Strauss |
| 3,617,389 A | * 11/1971 | Kuhn et al. .................. 502/101 |
| 3,640,829 A | 2/1972 | Elton |
| 3,679,540 A | 7/1972 | Zimmerman et al. |

(Continued)

FOREIGN PATENT DOCUMENTS

| | | |
|---|---|---|
| AU | 88-17506 | 4/1989 |
| EP | 0 326 360 A2 | 8/1989 |
| EP | 0 326 632 | 9/1989 |
| EP | 0503147 | 9/1992 |
| EP | 0550262 | 7/1993 |

(Continued)

OTHER PUBLICATIONS

Verbrugge et al. "Composite Membranes for Fuel–Cell Applications" AIChE Journal, vol. 38, No. 1, Jan. 1992, pp. 93–100.

Taylor et al. "The Effect of Support Morphology on Composite Membrane Performance", Electrochemical Society Meeting, San Diego, Oct. 19–24, 1986.

(Continued)

*Primary Examiner*—Jerry D. Johnson

(57) ABSTRACT

An integral composite membrane is provided including a porous polymeric membrane impregnated with a perfluoro ion exchange material to make the micropores of the membrane occlusive and a surfactant having a molecular weight greater than 100 wherein the thickness of the composite membrane is less than 0.025 mm. Methods for making and regenerating the integral composite membrane are also provided.

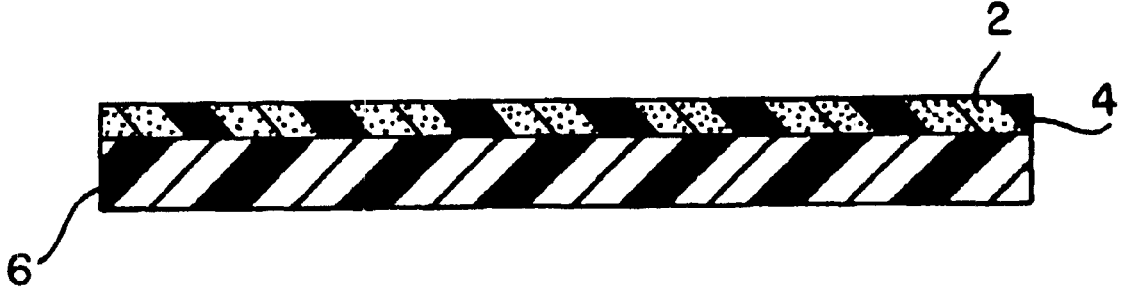

U.S. PATENT DOCUMENTS

| | | | |
|---|---|---|---|
| 3,870,593 A | | 3/1975 | Elton et al. |
| 3,953,566 A | | 4/1976 | Gore |
| 3,962,153 A | | 6/1976 | Gore |
| 4,012,303 A | | 3/1977 | D'Agostino et al. |
| 4,065,534 A | | 12/1977 | Rechlicz et al. |
| 4,096,222 A | | 6/1978 | Bosley |
| 4,096,227 A | | 6/1978 | Gore |
| 4,100,238 A | | 7/1978 | Shinomura |
| 4,110,390 A | | 8/1978 | Olcott et al. |
| 4,178,218 A | | 12/1979 | Seko |
| 4,186,076 A | | 1/1980 | de Nora et al. |
| 4,187,390 A | | 2/1980 | Gore |
| 4,197,148 A | | 4/1980 | Shinomura |
| 4,207,163 A | | 6/1980 | Kadija |
| 4,207,164 A | | 6/1980 | Kadija |
| 4,210,510 A | | 7/1980 | Grimes |
| 4,224,121 A | | 9/1980 | Dempsey et al. |
| 4,262,041 A | | 4/1981 | Eguchi et al. |
| 4,267,364 A | | 5/1981 | Grot et al. |
| 4,313,832 A | | 2/1982 | Shimizu et al. |
| 4,429,000 A | | 1/1984 | Naka et al. |
| 4,437,951 A | | 3/1984 | Bissot et al. |
| 4,469,744 A | | 9/1984 | Grot et al. |
| 4,515,906 A | * | 5/1985 | Friesen et al. ............... 521/28 |
| 4,518,650 A | | 5/1985 | Grot et al. |
| 4,539,256 A | | 9/1985 | Shipman |
| 4,544,458 A | | 10/1985 | Grot et al. |
| 4,568,441 A | | 2/1986 | Covitch et al. |
| 4,629,563 A | | 12/1986 | Wrasidlo |
| 4,664,801 A | | 5/1987 | Thomas |
| 4,698,243 A | | 10/1987 | Carl et al. |
| 4,720,400 A | | 1/1988 | Manniso |
| 4,726,989 A | | 2/1988 | Mrozinski |
| 4,774,039 A | | 9/1988 | Wrasidlo |
| 4,804,592 A | | 2/1989 | Vanderborgh et al. |
| 4,849,311 A | | 7/1989 | Itoh et al. |
| 4,863,604 A | | 9/1989 | Lo et al. |
| 4,865,930 A | | 9/1989 | Kindler et al. |
| 4,902,308 A | * | 2/1990 | Mallouk et al. ............... 95/50 |
| 4,931,168 A | | 6/1990 | Watanabe et al. |
| 4,985,296 A | | 1/1991 | Mortimer, Jr. |
| 4,990,228 A | | 2/1991 | Perusich et al. |
| 4,997,567 A | | 3/1991 | Messalem et al. |
| 5,066,403 A | | 11/1991 | Dutta et al. |
| 5,075,006 A | | 12/1991 | Schucker |
| 5,082,475 A | | 1/1992 | Bentz |
| 5,087,767 A | * | 2/1992 | Okamoto et al. ............ 568/727 |
| 5,124,018 A | | 6/1992 | Furuya et al. |
| 5,154,827 A | | 10/1992 | Ashelin et al. |
| 5,183,713 A | | 2/1993 | Kunz |
| 5,186,877 A | | 2/1993 | Watanabe |
| 5,209,850 A | | 5/1993 | Abayasekara et al. |
| 5,234,777 A | | 8/1993 | Wilson |
| 5,256,503 A | | 10/1993 | Cook et al. |
| 5,275,725 A | | 1/1994 | Ishii et al. |
| 5,288,384 A | | 2/1994 | Banerjee |
| 5,322,602 A | | 6/1994 | Razaq |
| 5,336,384 A | | 8/1994 | Tsou et al. |
| 5,338,412 A | * | 8/1994 | Burk et al. ................. 205/635 |
| 5,356,663 A | | 10/1994 | Perusich et al. |
| 5,415,888 A | | 5/1995 | Banerjee et al. |
| 5,422,411 A | | 6/1995 | Wei et al. |
| 5,425,865 A | | 6/1995 | Singleton et al. |
| 5,447,636 A | | 9/1995 | Banerjee |
| 5,468,574 A | | 11/1995 | Ehrenberg et al. |
| 5,472,799 A | | 12/1995 | Watanabe |
| 5,521,023 A | | 5/1996 | Kejha et al. |
| 5,523,181 A | | 6/1996 | Stonehart et al. |
| 5,545,475 A | | 8/1996 | Korleski |
| 5,547,911 A | | 8/1996 | Grot |
| 5,597,659 A | | 1/1997 | Morigaki et al. |
| 5,766,787 A | | 6/1998 | Watanabe et al. |
| 5,795,668 A | | 8/1998 | Banerjee |
| RE37,307 E | | 8/2001 | Bahar et al. |
| RE37,656 E | | 4/2002 | Bahar et al. |
| RE37,701 E | | 5/2002 | Bahar et al. |
| 2003/0113604 A1 | | 6/2003 | Bahar et al. |

FOREIGN PATENT DOCUMENTS

| | | |
|---|---|---|
| EP | 0 574 810 B1 | 12/1993 |
| EP | 0 579 852 A1 | 1/1994 |
| EP | 0 581 510 A1 | 2/1994 |
| EP | 0 594 007 A1 | 4/1994 |
| EP | 0 651 455 A1 | 5/1995 |
| EP | 0 661 336 A1 | 7/1995 |
| EP | 0 574 791 BA | 8/1995 |
| FR | 2 295 982 | 3/1977 |
| GB | 1 339 207 | 11/1973 |
| GB | 2 009 788 A | 6/1979 |
| GB | 2 026 381 A | 2/1980 |
| GB | 2 052 382 A | 1/1981 |
| GB | 2091166 A | 7/1982 |
| GB | 2 097 788 A | 11/1982 |
| JP | 57-134586 C | 8/1982 |
| JP | 61-246394 | 11/1986 |
| JP | 61-276987 | 12/1986 |
| JP | 62131038 | 6/1987 |
| JP | 63-030542 | 2/1988 |
| JP | 63-11979 B | 3/1988 |
| JP | 63-99246 | 4/1988 |
| JP | 64-22932 | 1/1989 |
| JP | 11-58051 | 3/1989 |
| JP | HEI 1-186752 | 7/1989 |
| JP | 2-230662 | 9/1990 |
| JP | 2-291607 | 12/1990 |
| JP | 3-15934 | 3/1991 |
| JP | 60-84590 | 10/1993 |
| JP | 6-29032 | 2/1994 |
| WO | WO 89/06055 | 6/1989 |
| WO | WO 90/13593 | 11/1990 |
| WO | WO 95/16730 | 6/1995 |

OTHER PUBLICATIONS

Asawa "Material Porperties of Cation Exchange Membranes for Chloralkali Electrolysis, Water Electrolysis and Fuel Cells", Journal of Applied Electrochemistry, vol. 19, No. 4, 1989, pp. 566–570.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 8–10, 29–34, 43, 44 and 48–50 are cancelled.

Claims 1, 4, 7, 35, 45 and 47 are determined to be patentable as amended.

Claims 5, 6, 11–28, 36–42, 46 and 51–60, dependent on an amended claim, are determined to be patentable.

1. An integral air impermeable composite membrane comprising:
   a *fluorinated* polymeric support having a microstructure of micropores, said microstructure defining a porosity in the range of about 70% to 98% within said polymeric support,
   at least one ion exchange resin filling *and thereby occluding said micropores of* said microstructure such that *said resin filled microstructure of* said composite membrane is air impermeable, said composite membrane having a thickness of at most 0.8 mils and an ionic conduction rate of at least 5.1 μmhos/min.

4. The composite membrane of claim [3] *1*, wherein said fluorinated polymer is polytetrafluoroethylene.

7. The composite membrane of claim [3] *1*, wherein said microstructure includes nodes interconnected with fibrils.

35. An substantially air occlusive intregral composite membrane having a *fluorinated* polymeric support with a microstructure of pores, said microstructure filled with an ion exchange resin *thereby occluding said pores*, said composite membrane has an ionic conduction rate of at least 5.1 μmhos/min, said composite membrane prepared by,
   (a) providing a *fluorinated* polymeric support having a microstructure of micropores;
   (b) applying an ion exchange resin solution to said polymeric support; and
   (c) repeating step (b) until said micropores are sufficiently filled with ion exchange resin to *occlude said micropores and* form an air occlusive integral composite membrane.

45. The composite membrane of claim [44] *35*, wherein said fluorinated polymer is polytetrafluoroethylene.

47. The composite membrane of claim [44] *35*, where said microstructure includes nodes interconnected with fibrils.

* * * * *